July 20, 1965
T. H. CHAMBERS
3,196,435
FM SEARCH RADAR EMPLOYING EXPANDING AND
COLLAPSING LOBE STRUCTURE
Filed Jan. 30, 1962
2 Sheets-Sheet 1
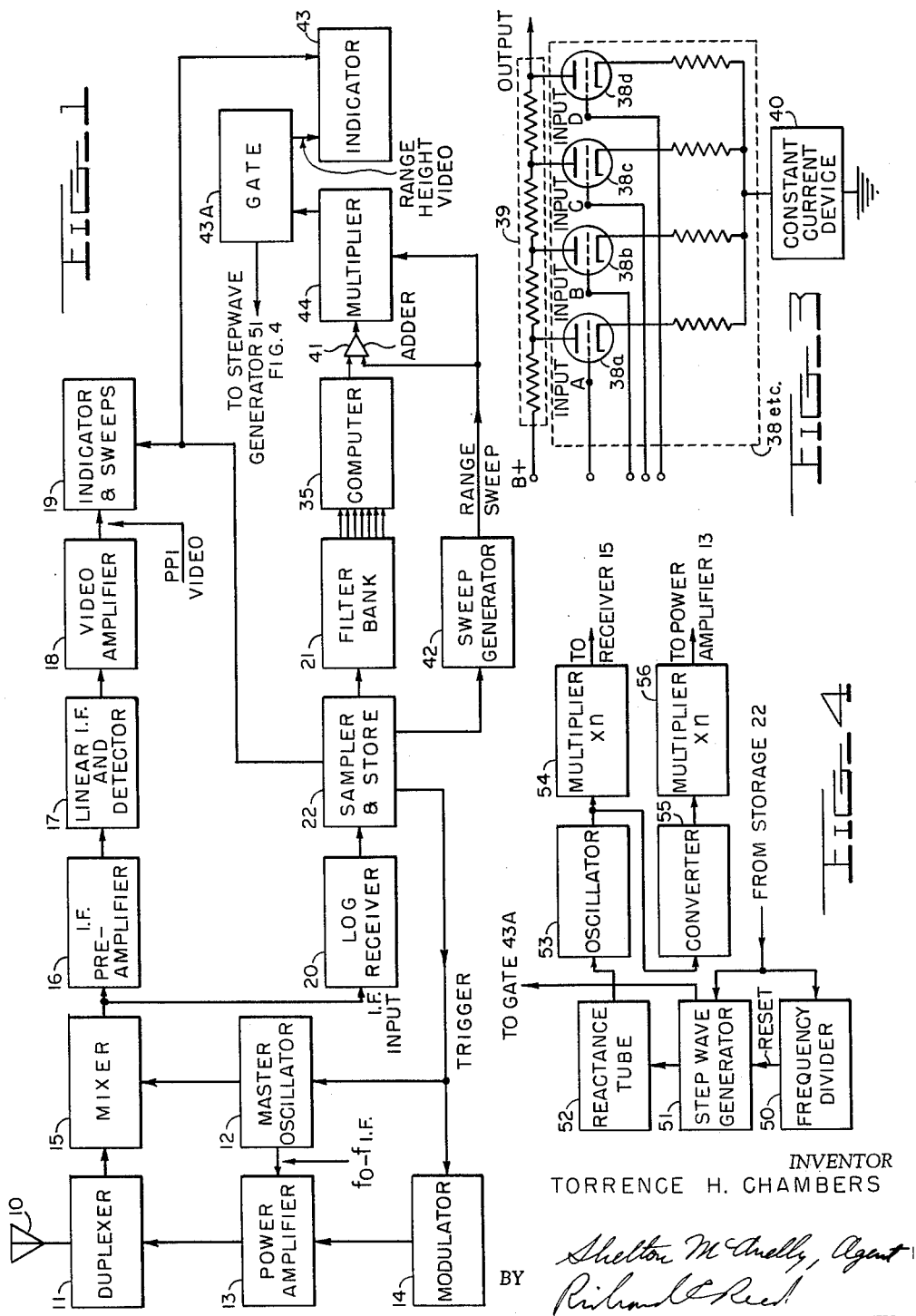
INVENTOR
TORRENCE H. CHAMBERS
BY
ATTORNEY

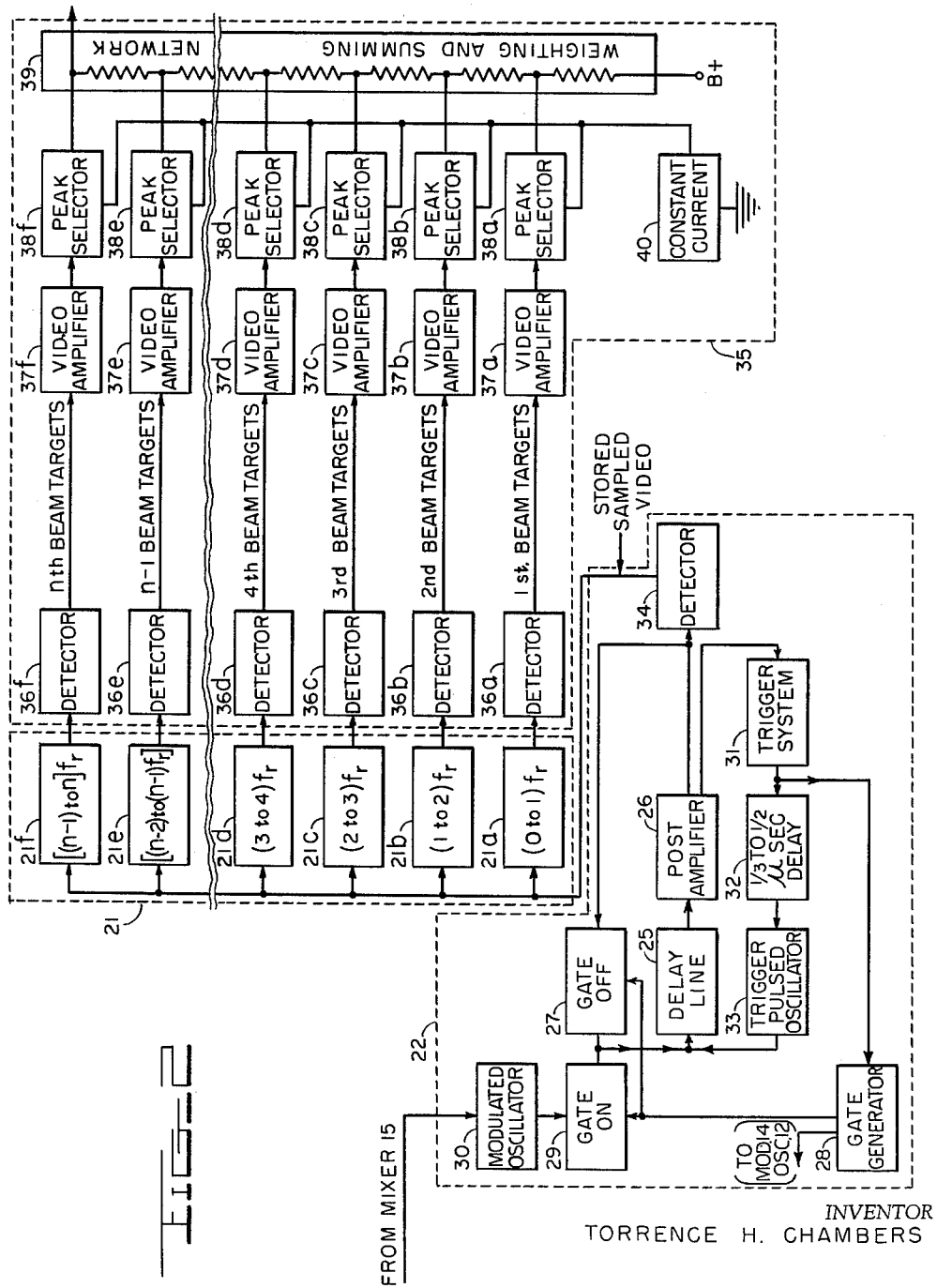

United States Patent Office 3,196,435
Patented July 20, 1965

3,196,435
FM SEARCH RADAR EMPLOYING EXPANDING
AND COLLAPSING LOBE STRUCTURE
Torrence H. Chambers, Washington, D.C., assignor to the
United States of America as represented by the Secretary of the Navy
Filed Jan. 30, 1962, Ser. No. 169,981
11 Claims. (Cl. 343—11)
(Granted under Title 35, U.S. Code (1952), sec. 266)

The invention described herein may be manufactured and used by or for the Government of the United States of America for governmental purposes without the payment of any royalties thereon or therefor.

This invention relates to search radar systems having capability for determining the height of a distant energy reflective object and in particular to a system wherein the radar transmitter frequency is deliberately varied to cause the lobes of the antenna pattern to sweep across the distant energy reflective object to derive the desired height information.

Height finding with the fire control type radar system in which highly directive antennae can be oriented in the elevation plane as well as the azimuth plane are well known in the art and provide highly accurate results when it is possible to concentrate on or "searchlight" a particular energy reflective object. The situation is entirely different with the class of radars known as search radars which are intended to continuously scan a large area to provide initial detection of targets rather than to concentrate on a specific target that is already located. To alter the normal continuous search function of a radar system to concentrate on a particular target for the length of time ordinarily required to make an elevation scan, even if possible, is undesirable because it interrupts the normal searching process and could conceivably result in the failure to locate other and possibly dangerous energy return objects during periods of such elevation determination. Since many craft carry only search radar it would thus be desirable to provide facilities in a search radar for determining the elevation of distant energy reflective objects without causing any substantial interruption in the conventional sweeping or search functions.

For many years it has been recognized that, since the spatial pattern of illumination by a given lobe is approximately known and since the range of the target is known, a rough measure of target height can be made from an analysis of the response to the lobe structure of low frequency radar systems when the distant energy reflective object is followed for a period of time and determination made of the lobe in which the distant energy reflective object is located. Another prior art system of this general type is the so-called "lobe-counting" system in which the number of lobes through which the target passes in closing range a given amount is related to the target's range, the frequency of the radar system, and the height of the antenna for purposes of determining the height of the distant energy reflective object. This lobe-counting method gives good results but it suffers from a serious defect in that it requires that the distant energy reflective object travel several miles at a constant height in order to provide sufficient signal variation dependent upon altitude in its passage through the lobe structure of the antennae. While there is little likelihood that an attacking aircraft or missile will use programmed or random height changes which are inherently uneconomical in terms of fuel consumption merely to provide countermeasures against such a height finder, the requirement that the radar system interrupt its searching operations so as to preclude the location of other approaching objects in order to searchlight a particular object on which height information is to be obtained seriously degrades the information rate of the radar system. In order to avoid this degradation of information rate it is desirable that a system capable of making a very rapid, if not instantaneous, height measurement, be available for a search radar system.

It is, accordingly, an object of the present invention to provide a height finder search radar system which avoids the undesired degradation of information rate outlined in the foregoing.

Another object of the present invention is to provide a search radar system capable of making an almost instantaneous height measurement.

Another object of the present invention is to provide a method of utilizing the normally undesired lobe characteristics of a radar antenna to advantage to provide a means for determining almost instantaneously the height of a distant energy reflective object.

Another object of the present invention is to provide a method of height finding for a search radar system which performs its height finding function during the conventional angular scanning operation of the search radar system and which does not require an interruption in such scanning operation.

Other objects and many of the attendant advantages of this invention will be readily appreciated as the same becomes better understood by reference to the following detailed description when considered in connection with the accompanying drawings wherein:

FIG. 1 shows in block form a typical embodiment of the features of the present invention;

FIG. 2 shows additional detail of the storage and computer portion of FIG. 1;

FIG. 3 shows details of a typical peak selector for FIG. 2;

FIG. 4 shows typical details of a master oscillator 12 of FIG. 1.

As is well known, the coarseness or fineness of the lobe structure of a radar antenna is dependent in part upon the frequency involved. This phenomenon is discussed more fully in pages 34–41 of Volume 13 of the MIT Radiation Laboratory Series titled "Propagation of Short Radio Waves," published in 1951 by McGraw-Hill Book Co.

In further explanation, if a radar antenna is placed at a fixed height above the earth and the radar frequency is changed, the radar antenna lobe structure will expand and collapse much as the folds of an accordian. For the present invention it is important to recognize that, with the ground as a reference, the amount of motion of the lobe structure of the antenna relative to a distant energy return object will be dependent upon the angle above ground of the distant energy return object so that target elevation angle can be measured simply by measuring the rate at which the antenna lobes resulting from the swept frequency of the transmitter pass through the distant energy reflective object as the radar frequency is changed. In the idealized simple case with low-angle targets over a plane surface and a fixed radar frequency sweep, the elevation angle of the target is linearly related to the modulation frequency applied to the radar echo by the sweeping of the lobe structure. Where provision must be made for curvature of the earth, as would, of course, practically always be required, the relationship is more complex, being given by the following equation:

$$\phi \cong \frac{h_2}{R} = \frac{\lambda X}{2h_1} + \frac{R}{2D(1+2h_1^2/\lambda XR)} + \frac{2h_1^5}{\lambda^3 X^3 D^2(1+2h_1^2/2XR)^4} + \cdots \quad (1)$$

where
$h_2$=target height,
$R$=target range,
$\phi$=target elevation angle,
$\lambda$=nominal radar wavelength,
$h_1$=radar antenna height,
$D$=effective earth's radius, and
$X=N_L(f_0/\Delta f)$, the number of lobes passing through the target multiplied by the quiescent frequency and divided by the frequency span.

While certain circumstances may justify the complex computer required to provide an exact solution to Equation 1, the resolution of conventional search radar systems is such that an exact solution is not logically required and a sufficiently accurate evaluation of the target elevation angle is defined by an equation of the form:

$$\phi = \frac{N_L c}{2h_1 \Delta_f} + \frac{R}{2D} \quad (2)$$

where $c$=propagation velocity.

Equation 2 is linear and consists of a term in $N_L$ plus a correction for the curvature of the earth. It is possible to mechanize the solution of the equation in a relatively simple computer device of comparatively light weight and modest power and space requirements.

With reference now to FIG. 1 of the drawing, a basic embodiment of the features of the present invention is shown. This showing is neither the simplest form nor the most exotic designed to have the greatest flexibility and accuracy but rather is an intermediate form selected for a typical reduction to practice because of the ready adaptability of a pre-existing log receiver, a storage device capable of signal enhancement by integration, a filter, and a computer device.

The principal components in addition to those mentioned above are a radar transmitter which could be conventional except for provision for frequency modulation of the RF carrier frequency, together with associated antenna, duplexing, and receiver low level stages, with special provision for deriving the receiver "local oscillator" signal from the transmitter oscillator to compensate for the transmitter frequency modulation.

To proceed structurally from this brief introduction to FIG. 1, the apparatus contains a suitable directive antenna 10 which can be a conventional search radar antenna requiring only azimuth orientation at a typical rate of 6 revolutions per minute. Typically, an antenna for such service might have an azimuth beam-width of 10 degrees and an elevation beam width of 40 degrees, the latter being usually the result of antenna space restrictions, with a narrower elevation beamwidth approaching the desired elevation angle coverage being adequate. Unlike its counterpart in a fire control radar system having elevation sweep for height finding, as well as an azimuth sweep, the search antenna 10 of this system does not require either a narrow beam width or an elevation sweep, however, it may be desirable with antennas having narrow elevation beam width that provision for elevation angle adjustment be available. One requirement that is placed upon the antenna as well as all the radio frequency components to be described is that they be designed to efficiently handle the operation over the frequency range produced by the modulation involved. Generally speaking, the frequency bandwidth required for height finding frequency modulation will exceed the normal pulse bandwidth because of the relatively long duration pulses involved in conventional search radar operation, however, it should be recognized that certain apparatus combinations are within the realm of the present invention wherein the frequency modulation of the system for elevation determination purposes inserts no significant increase in bandwidth requirements beyond those already conventional for other specific purposes or merely present or desirable as good engineering practice.

Antenna 10 is normally adapted for alternate operation for both transmission and reception by the duplexer 11 which in conventional usage is typically either an active or a passive device for channeling outgoing transmitter energy to the antenna 10 rather than the receiver components and incoming energy to the receiver where it can be utilized to advantage rather than being lost in the transmitter.

The transmitter actually has three principal components in FIG. 1, the master oscillator 12, power amplifier 13 and modulator 14, however, in certain instances it is advantageous to derive timing signals for the modulator from additional apparatus which will be described subsequently.

The modulator 14 is a conventional pulse radar modulator capable of handling the desired pulse power and having desired cycling characteristics.

To achieve utmost transmitter frequency stability and frequency modulator flexibility, the M.O.P.A. arrangement is preferable although not essential. In this device a basic signal is generated by oscillator 12, usually at some relatively low radio frequency (such as 5–10 mc.), this signal having the necessary frequency modulation applied to it at its generation by a reactance tube arrangement or at some subsequent step by a frequency translator device. In addition the master oscillator block would typically contain frequency and power multipliers and the like, details of such being well known in the art for supplying a suitable drive signal to the power amplifier 13 at the frequency $f_0-f_{I.F.}$ and the local oscillator signal $f_0$ to the mixer 15 of the receiver portion of the system to maintain synchronism between the outgoing and return frequencies.

Thus far the term frequency modulation has been used rather loosely without a detailed presentation of the exact nature of frequency modulation required to derive or produce the height finding information. It has been stated that the lobes of an antenna pattern (particularly when operated at an oblique angle relative to a ground plane) expand and contract as the frequency changes and that the rate at which these lobes sweep across a distant object to produce periodic variation in the return signal is a function of the height of that object above the ground plane.

A typical situation may be taken based upon an eight degree elevation coverage, altitude range of 7,000 to 15,000 feet, nominal direct range 10,000 feet and a RF frequency of 435 megacycles with which a frequency modulation of ($\Delta f$) of 8.85 megacycles would be involved. With this, radar pulse duration of 20 microseconds is typical and the antenna azimuth beam width (typically 10 degrees), the radar PRF (typically 300 pulses per second) and the antenna sweeping rate (typically 6 r.p.m.) being correlated to produce about 50 pulses on a distant point target each time the antenna beam sweeps over it.

Efficient signal correlation requires then the storage and analysis of signals received for 50 successive radar pulses. This manipulation involves the following basic steps:

(1) Compression of the dynamic range of incoming signals.

(2) Storage and reproduction of return signals responsive to 50 successive radar transmitter pulses.

(3) Measurement of the frequency of modulation of the stored information to obtain the first term of Equation 2.

(4) Add to the above, a constant times the target range, this gives target elevation angle.

(5) Multiply the result by target range, this gives target height.

At this stage of development and presentation of the discussion of the technique involved, the requirement for covering the typical $\Delta f$ of 8.85 megacycles per second with 50 pulses requires a pulse to pulse variation of approximately 180 kilocycles per second. If linear during the period from one pulse to the next, this would insert a frequency variation over the reception period following each pulse which is substantially greater than the receiver bandwidth usually employed for a 20 microsecond pulse duration.

Thus, stepwise frequency modulation is desired with the transmitter frequency remaining constant during each transmitter pulse and the reception period that follows, shifting by 180 kilocycles per second immediately prior to the next transmitter pulse. This sequence will be followed continuously and repetitiously and can be timed by the same system that provides timing of the keying of modulator 14.

Thus, the nature of the frequency modulation involved is apparent as is the need for the components 12 and 13 to provide this modulation and the obviousness of the types of well known circuits which could be combined in these components to provide the desired result.

With the mixer 15 thus provided with a "local oscillator" signal which steps in frequency in synchronism with the transmitter, a constant frequency difference of $(f_{I.F.})$ is maintained for delivery to the first stages 16 of the intermediate frequency amplifier of the radar system.

Additional conventional radar components I.F. amplifier, detector, video frequency amplifier and indicator (PPI) are provided in blocks 16, 17, 18, 19. Indicator 19 provides the conventional PPI indication customarily employed for search radar systems. It is, of course, understood that more complex prior art types of indication and analysis equipment, such as that for precision range determination, automatic range followup and the like are readily adaptable to this basic azimuth system. These refinements work in conventional manner without deleterious effect due to the transmitter frequency modulation, except for absence of the periodic signal fade-out from signal amplitude fluctuations caused by the more or less fixed lobes of fixed frequency radar systems.

The utilization of the received signal to derive elevation information is accomplished in the signal path beginning with the log receiver 20 which is connected to the output of the mixer 15. The log receiver is an intermediate frequency amplifier which has a logarithmic relationship between input and output to provide amplification as well as compression of the 60 to 80 db dynamic range of input signals to a dynamic range of output signals of less than 20 db without losing the amplitude modulation.

A filter bank 21 is employed to separate the received signals in accordance with their frequency, a storage device 22 being interposed between the log receiver 20 and the filter bank 21 to simultaneously provide information from all 50 successive radar pulses to the filter bank so that it may make an analysis of the modulation frequency. The storage device uses a recirculating delay line loop to store signals received over 50 adjacent sweeps and is gated to eliminate the oldest information while new information is introduced in its place. The device requires very wide band characteristics because of the necessity to avoid undue signal distortions in 50 passes of the signals through the delay line and also precise timing of the input and blocking gates to insure the proper time relationship in the recirculating signals. This storage device, although it involves considerable engineering skill in design, is not novel at this state of the art being described in great detail in the copending application of T. H. Chambers and Lawrence F. Kalnoskas, Serial No. 107,559, filed May 3, 1961, entitled Improved Delay Line Storage System.

Basically, this storage device is indicated in block form to an extent sufficient to appreciate the essential details thereof in FIG. 2 of the drawing to which attention is now directed. This system contains a fuzed quartz delay line 25 in a loop with post amplifier 26 and gate 27. In operation, gate 27 is periodically blocked by a signal from gate generator 28 to interrupt the recirculation to remove old signals. Gate 29 is connected to the loop and also gated by gate generator 28 to insert new signals while gate 27 is blocked to remove old signals. New signals are applied to gate 29 in the form of a modulated carrier containing the received signals. Modulation is provided by modulator 30, the carrier frequency being selected as suitable for the signal frequencies involved and for the characteristics of the delay line. A carrier frequency of 40 mc. is typical.

Timing of the gate generator is accomplished with precision imparted by the delay line using a second recirculating loop consisting of the delay line 25, post amplifier 26, trigger system 31, a second delay line 32 having a delay of ⅓ to ½ microsecond, together with a pulsed oscillator 33. This loop operates at a slightly lower frequency than the main storage loop because of delay 32 and at a higher pulse signal amplitude through delay line 25 to permit ready differentiation between the timing signals and the radar receiver signals in the post amplifier 26, for example.

The term "range element" is now introduced for the benefit of the reader in connection with the succeeding paragraph. A "range element" is merely an increment of range blanketed by the transmitter pulse. Thus, the range element for a 20 microsecond transmitter pulse is about 1½ miles. It is not achieved by any special apparatus, but effectively is the minimum range resolution possible with the system.

In operation, the gate 29 inserts into the delay line 25 a single sample ⅓ to ½ microsecond in width from each range element of the video for each sweep. Upon passage through the loop, the first sample will be reapplied to the delay line immediately before the insertion of a new sample from the now current range sweep. The delay line 32 causes this displacement since it is in the trigger circuit loop which also triggers the radar modulator 14. Succeeding passages through the delay line will give the first sample additional displacement, the total displacement being proportional to the number of passages the signal makes through the system. Ultimately, after this first sample has drifted the width of an entire range element it will move into the position into which the current sample of the adjacent range element is to be placed by the gating system. At this point the recirculating signal loop will be broken by the gate tube in the loop and this first sample will be dropped out of the system. Thus, on any given range sweep, the $N^{th}$, for example, there will be in each and every range element of the storage 22 a set of $m$ pulses representing the signal levels from that range element over the preceding $m$ range sweeps.

The frequency at which the returning echo was modulated by the sweeping of the lobe structure is now very easily obtained since the store contains groups of pulses representing in both amplitude and time sequence the echoes from a particular range element as it appeared on the preceding $m$ range sweeps.

The signals circulating through the storage system are detected by detector 34 and fed to the filter bank 21 (21a, 21b, 21c, 21d, 21e, 21f) where they are separated on the basis of modulation frequency. Each filter output consists of a video frequency signal successively indicating the presence or absence of a target in each range element and within a particular small range of elevation angles.

At this point, the information derived from the frequency analysis is not in quite the form desired. It is desirable to have a single video signal in which echo modulation frequency is represented by amplitude rather than a set of signals representing a set of frequency increments and giving only yes-no answers. To provide this, the computer 35 is provided in FIG. 1, having individual channels for each filter frequency, each channel including as shown in FIG. 2 a detector (36a, etc.), video amplifier (37a, etc.), peak selector (38a, etc.), together with a weighting and summing network 39 and constant current device 40.

The peak selectors are merely a combination of devices typified in FIG. 3 for four inputs. It is readily seen that the tube 38, etc. receiving the largest signal, will effectively raise the potential of all cathodes, so that only the large signal tube conducts to control the output across the associated anode resistor which is sufficiently small so as not to adversely affect the cathode follower form of action. The constant current device in its simplest form is merely a resistor having a large value relative to the tube resistance as seen at the cathodes of the tubes (including the anode resistors), however, a more elaborate constant current device can be used if desired.

The outputs of the peak selectors are combined in the weighting and summing network 39. This network is a series string of resistors with the peak selectors connected along them so as to obtain a greater output for the upper angle ranges such as $[(n-2)$ to $(n-1)]$ and $[(n-1)$ to $n]$ than the lower angle ranges. This provides, then, an output whose magnitude is proportional to elevation angle. The operation of components 38 (etc.), 39 and 40 is described in detail in application No. 406,098 of T. H. Chambers, entitled Elevation Angle Computer for Stacked Beam Height Finding Radar System, filed January 25, 1954, now Patent No. 3,070,795.

Following the computer 35, FIG. 1 indicates a component 41 indicated schematically as an adder device which adds in a signal proportional to range, the second term of Equation 2, which is obtained from the sweep generator 42. Thus the output from adder 41 is that given by Equation 2 which must be subject to a further computer manipulation in multiplier 44. It is an elevation angle signal which must be multiplied by target range in order to obtain the target height above the earth. This manipulation is provided by the multiplier 44 which is connected to the sweep generator 42 and the adder 41 to obtain input signals to be multiplied.

The indicator 43 is connected to the multiplier 44 to a source of trigger and typically utilizes a cathode ray tube device to provide a presentation of target height versus range.

The storage output is synchronized to the radar transmitter by virtue of the control of the transmitter pulsing from the storage device. Thus the storage device delivers in sequence the return from one range element for the preceding $m$ sweeps and then the return from the next range element for the same $m$ sweeps and so on. The multiplier manipulation employing the indicator range sweep signal is thus tied-in to the operation of the complete system.

A typical master oscillator arrangement is shown in FIG. 4. This provides the desired stepwise variation of the transmitter and receiver local oscillator signal. In this apparatus trigger signals are obtained from the timing portion of the storage device 22 of FIG. 1 and typically recur every 3300 microseconds, being also employed to produce triggering of the modulator 14. Since it is desired that a height analysis take place during the period of illumination of a distant target as established by the antenna 10 beamwidth and rotation rate, a typical 50 pulses on target has been previously discussed. Since it is desired to cover the frequency modulation range stepwise with a number of steps equal to the number of pulses on the target, 50 discrete steps are required, the specific amount being established by frequency divider 50 which is connected to the trigger pulse portion of storage device 22. The frequency divider 50 is connected to step wave generator 51 and actually may be a part thereof. Frequency divider 50 produces a stepwise repetitive waveform with uniform amplitude steps occurring between each reset signal. The divider ratio selects the number of steps, since if 50 trigger pulses occur between each reset pulse, there will be 50 steps in the output.

Step wave generator 51 is connected to reactance tube 52 which in turn is connected to oscillator 53 to provide stepwise control in oscillator frequency.

The oscillator is connected through multiplier 54 to receiver mixer 15 and through converter 55 and multiplier 56 to power amplifier 13. The relationship of the oscillator frequency and the multiplier ratios is selected so that they are such, considering any additional frequency manipulation in the amplifier 13 and mixer 15, to result in the production of the desired carrier frequency for I.F. 16.

Although the electronic control of frequency is typified, it is understood that other arrangements are practical such as a stepwise relay having the typical 55 steps covered in a continuous manner without requiring reset signals or the frequency divider 50.

Furthermore it is desired to accomplish precise timing of the transmitter firing with the occurrence of each step so that stability of the oscillator for each new step is achieved immediately prior to the transmitter firing so that stable conditions prevail during each transmitter pulse and the reception period that follows. Some delay is inherent in the action of the modulator 14 and other components so that in certain particular configurations, particularly with electronic stepping as in FIG. 4 there may be no particular problem in this regard, however, it is well to bear in mind that it may be desirable to insert a delay line immediately preceding the modulator 14, but not the oscillator 12, or even to derive the trigger signals for oscillator 12 and modulator 14 from different points in the storage system. Typically the different points can be before and after the delay 32.

It will be realized that during the early part of each frequency sweep sufficient information will not be in the store to enable an accurate computation of the height. Therefore, it may be advantageous in some situations to place a gate 43–A in the signal path to indicator 43, this gate being blocked until approximately 45 to the total 50 pulses for a complete frequency sweep are in the store. Thus information will be presented only during the last five pulses of the frequency sweep. Gating of component 43–A is readily accomplished by a connection to step wave generator 51 of FIG. 1. This refinement is not necessary if the number of radar pulses in the radar frequency sweep cycle exceeds the number of pulses held by the storage device.

Such precautions as the foregoing are engineering details but are still considered worthy of mention, not as falling specifically within the inventive area of this application, but worthwhile assists to those who may seek to practice the invention.

What is claimed is:

1. A method of determining the elevation angle of an object comprising, alternately expanding and collapsing the lobe structure of a beam of energy directed toward the object whereby reflections contain modulation characteristic of the position of the object, receiving the reflected energy, and determining the received energy amplitude modulation frequency to categorize the elevation angle of the object.

2. A method of determining the height of an object comprising, alternately expanding and collapsing the lobe structure of a beam of energy directed toward the object whereby reflections contain modulation characteristic of the elevation angle of the object, receiving the reflected energy, analyzing the reflected energy amplitude modulation frequency to determine the elevation angle of the object, and computing the height from the elevation angle and the range information.

3. Apparatus for determining the elevation of a distant object above a reference surface comprising, means for directing a beam of frequency modulated energy toward the object, said beam containing a frequency variable lobe structure, means for receiving energy echoes from the object, said echoes being amplitude modulated as a result of variations in the lobe structure due to frequency modulation of the energy, said amplitude modulation thus being related to the original frequency modulation and characteristic of the elevation angle of the object above the reference surface, and means connected to said receiving means for deriving an elevation angle signal in dependency on the frequency of amplitude modulation of echoes.

4. Apparatus for determining the elevation of a distant object above a reference surface comprising, means for directing a beam of frequency modulated energy toward the object, said beam containing a frequency variable lobe structure, means for receiving energy echoes from the object, said echoes being amplitude modulated as a result of variations in the lobe structure due to frequency modulation of the energy, a filter system connected to the output of said means for receiving for separating the signals at that point corresponding to said echoes in accordance with the frequency of amplitude modulation, and means connected to the filter system and to the first named means for relating the output of said filter system to the frequency modulation of the energy to indicate the elevation of the object.

5. Apparatus for determining the elevation of a distant object above a reference surface comprising, means for producing a frequency modulated beam of energy directed toward the object, said beam containing a frequency variable lobe structure, means for receiving energy echoes from the object, said echoes being amplitude modulated as a result of variations in the lobe structure due to frequency modulation of the energy, a filter system connected to the output of said means for receiving for separating the signals at that point corresponding to said echoes in accordance with the frequency of amplitude modulation, a peak selector connected to said filter system for selecting the filter output having the largest signal, and means for indicating the filter whose output is selected.

6. Apparatus for determining the elevation of a distant object above a reference surface comprising, means for producing a frequency modulated beam of energy directed toward the object, said beam containing a frequency variable lobe structure, means for receiving energy echoes from the object, said eachoes being amplitude modulated as a result of variations in the beam lobe structure due to frequency modulation of the energy, a filter system connected to the output of said means for receiving for separating the echo signals in accordance with the frequency of amplitude modulation, selector means connected to the output of said filter system for selecting the filter system output having the largest signal, and means connected to the selector and to the first named means for relating the selected output to the frequency modulation of the energy to indicate the elevation of the object.

7. Apparatus for determining the elevation of a distant object above a reference surface comprising, means for producing a frequency modulated beam of energy orientable in azimuth toward the object, said beam containing a frequency variable lobe structure, means for receiving energy echoes from the object, said echoes being amplitude modulated as a result of variations in the beam lobe structure due to frequency modulation of the energy, means for storing received signals for a selected time period and reproducing the stored signals in groups on a range basis in time sequence for signal enhancement, a filter system connected to the reproduced signal output of said means for storing signals for separating the reproduced signals on a basis of frequency of amplitude modulation therein, selector means connected to the output of said filter system for selecting the filter output having the largest signal, and means connected to the selector and to the first named means for relating the selected output to the frequency modulation of the energy and the range of the object to indicate the elevation of the object.

8. Apparatus for determining the height of a distant object above a reference surface comprising, means for directing a beam of frequency modulated energy toward the object, said beam containing a frequency variable elevation lobe structure, means for receiving energy echoes from the object, said echoes being amplitude modulated as a result of variations in the lobe structure due to frequency modulation and being related to the original frequency modulation and characteristic of the elevation angle of the object above the reference surface, means for deriving an elevation angle signal in dependency on the frequency of the amplitude modulation of echoes, means for measuring the range between the apparatus and the object in terms of the delay between transmission of energy and receipt of echoes, and means for computing the height of the object from the range and the elevation angle signal.

9. Apparatus for determining the height of a distant object above a reference surface comprising, means for producing a frequency modulated beam of energy orientable in azimuth toward the object, said beam containing a frequency variable elevation lobe structure, means for receiving energy echoes from the object, said echoes being amplitude modulated as a result of variations in the beam elevation lobe structure due to frequency modulation of the energy, means for measuring the range between the apparatus and the object in terms of the delay between transmission of energy and receipt of echoes from the object, means for storing received signals for a selected time period and reproducing the stored signals in groups on a range basis in time sequence for signal enhancement, a filter system connected to the reproduced signal output of said means for storing signals for separating the reproduced signals on a basis of frequency of amplitude modulation therein, selector means connected to the output of said filter system for selecting the filter output having the largest signal, means connected to the selector and to the first named means for modifying the selected output according to the frequency modulation of the energy and the range of the object to produce a signal indicative of elevation angle of the object, and means for computing the height of the object from the range and the elevation angle signal.

10. A pulse-echo search radar system having target elevation finding capability comprising, means for producing a repetitive series of radar pulses of different carrier frequency whereby different antenna lobe structure in elevation is obtained for the various radar pulses of the series, the period of the series and hence also of the lobe variation being selected in accordance with the sweeping characteristics of the radar system such that substantially all azimuths desired to be searched in elevation are illuminated by pulses of the various frequencies of the series, means storing received signals for a duration of time at least equal to the period of the series, means reproducing stored signals in such manner that signals stored for a similar range for all pulses are reproduced in sequence for signal enhancement before change to reproduction of stored signals for another range whereby all ranges are ultimately analyzed for return signals, filter means for selecting reproduced signals on the basis of amplitude modulation frequency whereby an indication proportional to elevation angle is obtained.

11. A pulse-echo search radar system having target elevation finding capability comprising, means for producing a repetitive series of radar pulses of different carrier frequency whereby different antenna lobe structure in elevation is obtained for the various radar pulses of the series, means storing received signals for a duration of time at least equal to the period of the series, means reproducing stored signals in such manner that signals stored for a similar range for all pulses are reproduced in sequence for signal enhancement before change to reproduction of stored signals for another range whereby all ranges are ultimately analyzed for return signals, filter means for selecting reproduced signals on the basis of amplitude modulation frequency whereby an indication proportional to elevation angle is obtained.

References Cited by the Examiner

UNITED STATES PATENTS

| 2,402,410 | 6/46 | Kear | 343—106 |
| 3,017,630 | 1/62 | Begovich et al. | 434—14 |
| 3,029,429 | 4/62 | Rogers | 343—5 |
| 3,069,677 | 12/62 | Bruck et al. | 343—5 |

CHESTER L. JUSTUS, Primary Examiner.